US005877471A

United States Patent [19]
Huhn et al.

[11] Patent Number: 5,877,471
[45] Date of Patent: Mar. 2, 1999

[54] PLASMA TORCH HAVING A COOLED SHIELD ASSEMBLY

[75] Inventors: William A. Huhn, Fairbanks; Richard D. Dickman, Two Rivers, both of Ak.

[73] Assignee: The Regents of the University of California, Oakland, Calif.

[21] Appl. No.: 873,259

[22] Filed: Jun. 11, 1997

[51] Int. Cl.[6] .......... B23K 10/00

[52] U.S. Cl. .......... 219/121.49; 219/121.43; 219/121.52; 219/121.48; 315/111.51

[58] Field of Search .......... 219/121.52, 121.43, 219/121.49, 75, 121.48; 313/231.31, 231.41; 315/111.51, 111.21

[56] References Cited

U.S. PATENT DOCUMENTS

| | | | |
|---|---|---|---|
| 3,731,047 | 5/1973 | Mullen et al. | 219/75 |
| 3,862,393 | 1/1975 | Dundas et al. | 219/121.52 |
| 4,119,876 | 10/1978 | German et al. | 313/231.4 |
| 4,431,901 | 2/1984 | Hull . | |
| 4,849,675 | 7/1989 | Muller | 315/111.51 |
| 5,200,595 | 4/1993 | Boulos et al. | 219/121.52 |
| 5,233,155 | 8/1993 | Frind | 219/121.52 |
| 5,288,969 | 2/1994 | Wong et al. | 219/121.52 |
| 5,611,947 | 3/1997 | Vavruska | 219/121.52 |

OTHER PUBLICATIONS

Babat, George I.; “Electrodeless Discharges and some Allied Problems”, Journal of the Institute of Electrical Engineers; vol. 94, Part III, pp. 17–27, 1947.

Reed, Thomas B.; “Induction–Coupled Plasama Torch”, Journal of Applied Physics; vol.32, No. 5, pp. 821–824, May 1961.

*Primary Examiner*—Mark H. Paschall
*Attorney, Agent, or Firm*—Fulbright & Jaworski L.L.P.

[57] ABSTRACT

A plasma torch assembly for receiving electrical energy from an electrical energy source and generating a plasma in a gas from a gas source includes an induction coil to receive electrical energy from the electrical energy source and provide energy to generate an electromagnetic field for the plasma and a shield assembly to shield against energy from the plasma and transfer energy from the induction coil to the plasma. The shield assembly includes a dielectric cylinder, ceramic encasement lining and a plurality of thin walled tubes arranged in a circular array. The tubes are encased by and partially embedded in an encasement lining made of thermal resistant ceramic material that is molded or potted upon the outside surface of and between the metal tubes. The dielectric cylinder, tightly disposed over the encasement lining, provides a water proof barrier for the tubes and supports the ability to draw a vacuum. A water coolant jacket envelope, discharge isolator and the coil surround the shield assembly.

32 Claims, 6 Drawing Sheets

FIG. 6A
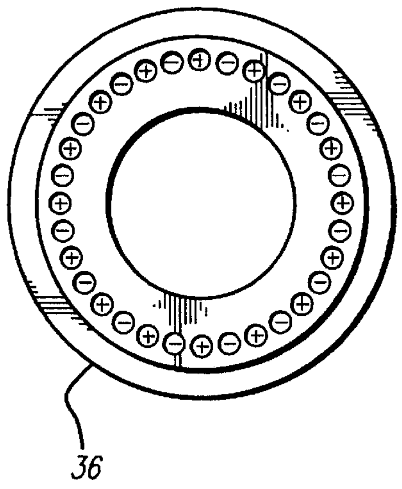
FIG. 6B
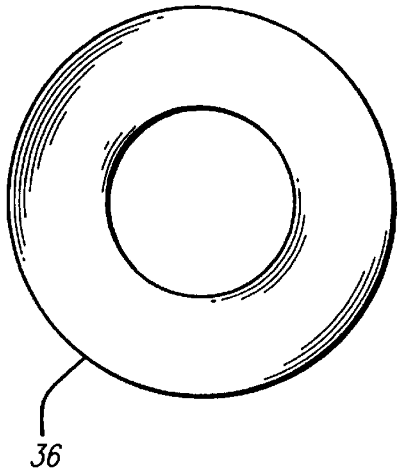
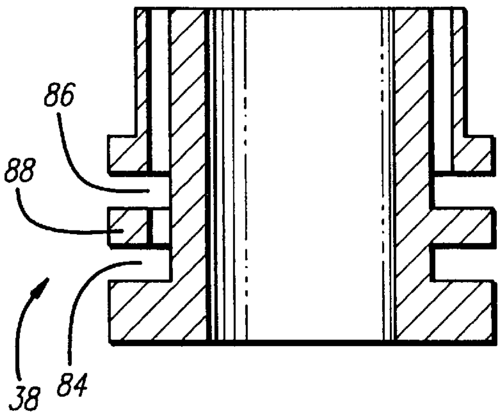
FIG. 6C
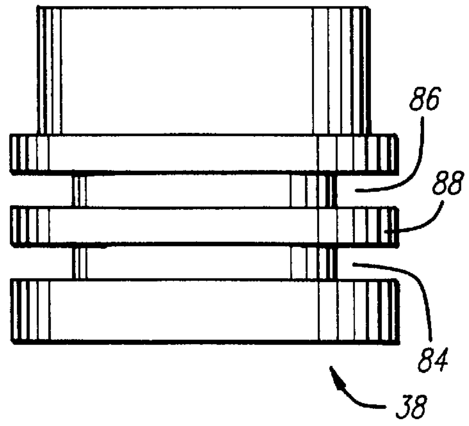
FIG. 6D

PLASMA TORCH HAVING A COOLED SHIELD ASSEMBLY

FIELD OF THE INVENTION

The invention relates generally to the field of plasma torches and more particularly to the field of inductively excited radio frequency plasma torches.

BACKGROUND OF THE INVENTION

An inductive plasma torch, which is based on inductive coupling to an ionized gas at or near thermal equilibrium and is electrodeless and can be used with any gas desired, is useful for many applications including non-thermal destruction of hazardous waste material. The torch forms a plasma of ions, electrons and neutral particles which is used to act on materials, such as waste material, to dissociate the material so that other compounds or materials may be formed from it. In particular, the plasma torch is used to excite the ions, electrons and neutral particles to an elevated temperature as a result of collisions and ultraviolet radiation.

Forms of such devices which operate based on inductive coupling to an ionized gas are well known. An early version of a plasma torch included a quartz tube of high thermal shock resistance disposed inside and coaxial to an induction coil which excited the plasma. Despite use of a high thermal shock resistance material to form the quartz tube, the early plasma torch suffered from melt or thermal stress cracking of the quartz wall. Numerous efforts were made to overcome this problem, including adding more cooling to the outside of the quartz confinement wall and later on, utilizing double wall jacketed quartz tubes with water cooling. Despite such efforts, early plasma torches failed to contain higher power densities at atmospheric pressures. Consequently, the power input involved in larger diameter systems was limited because of the destruction of the quartz material due to thermal stress.

In later developed plasma torches, segmented copper cooling tubes were arranged in a protective cylinder or sheath, some of which incorporated singular tubes ("Induction Plasma Heater With High Velocity Sheath", TAFA Bulletin 26-D8, July 1968) while others utilized thick wall counterflow tubes (U.S. Pat. No. 4,431,901 to Hull). The TAFA and Hull torches each included a copper tube protector, quartz tube and exciter coil, arranged in order of increasing diameter. The copper tube protector was segmented with individual tubes to reduce its interference with the coupling of the electric field component of the electromagnetic field from the coil. Otherwise, a complete contiguous metal protector would have absorbed much or all of the energy which meant no plasma would have been generated. However, a drawback of these systems is that they continued to use quartz tubes for secondary plasma containment and structural strength to withstand the pressures of the vacuums created primarily for plasma ignitions which are usually done at low pressures to enhance plasma excitation. The quartz was not only very brittle and could crack from simple mechanical stress, but was subject to continued destruction from intermittent electrical discharges between the coil and tube protector or from ionization of the gas space between the coil and tube protector.

The above problems are enlarged with an increase in the excitation frequency of radio energy used and become more serious at a frequency greater than approximately 1 MHz. To overcome such problems, some systems placed the coil in deionized water but the problem of quartz destruction continued with undesirable ionizations occurring within the gas space between the quartz tube and the metal tube protector. With the electromagnetic field strength being the greatest near the coil, undesirable discharges were more likely near the coil if not inhibited or prevented. Both the Hull and TAFA systems suffered from the above problems. Whenever the quartz wall would break, water would enter the system, flooding the apparatus and extinguishing the plasma. Moreover, the copper metal tube protector was subjected to destruction when used in oxidizing or reactive atmospheres.

To decrease electrical discharging problems, which were in part the result of capacitive coupling by the electric field, the technique of reducing the applied excitation frequency was used. Operating at lower frequencies also reduced the charge buildup in the plasma. As a result, many high power, ambient pressure RF plasma torches were forced to operate at reduced frequencies, such as at 0.5 Mhz. A drawback of operating at lower frequencies was that the plasma pinch effect was minimized. At higher frequencies, the plasma pinching effect increases, that is, the plasma is further drawn back from the wall of the containment tube thereby lessening the thermal stress to the wall and allowing for higher input powers with advanced reliability.

Further attempts to overcome the above problems were made, including utilizing ceramic walls with coolant flow between (which is disclosed in U.S. Pat. No. 5,200,595 to Boulos), radioactively cooled protector walls, porous ceramic confinement, and ceramic containment protectors. However, the above devices were generally subject to the same thermal stresses as quartz and were difficult and costly to manufacture.

The present invention eliminates disadvantages of the prior art and more particularly, improves on the plasma confinement capabilities of the metal tube protector to produce a system which is reliable and robust even at frequencies greater than 1 Mhz.

SUMMARY OF THE INVENTION

The present invention provides a plasma torch assembly for receiving electrical energy from an electrical energy source and generating a plasma in a gas from a gas source. It includes a structure to receive electrical energy from the electrical energy source and provide energy to generate a field in a space for the plasma, and a shield assembly about the space for the plasma to shield against energy from the plasma and transfer energy from the structure.

The foregoing and additional features and advantages of this invention will become apparent from the detailed description and accompanying drawing figures that follow. In the figures and the written description, numerals indicate the various features of the invention, like numerals referring to like features throughout for both the drawing figures and the written description.

BRIEF DESCRIPTION OF THE DRAWINGS

FIG. 5(*b*) is an enlarged, perspective view of a portion of the RF lead of the plasma torch assembly of FIG. 2;

FIG. 6(*a*) is a top, cross-sectional view of the base manifold and return and supply tubes of FIG. 4;

FIG. 6(*b*) is a bottom view of the base manifold of FIG. 4;

FIG. 6(*c*) is a front, cross-sectional view of the base manifold of FIG. 4; and FIG. 6(*d*) is a side view of the base manifold of FIG. 4.

DETAILED DESCRIPTION

Figure 1:
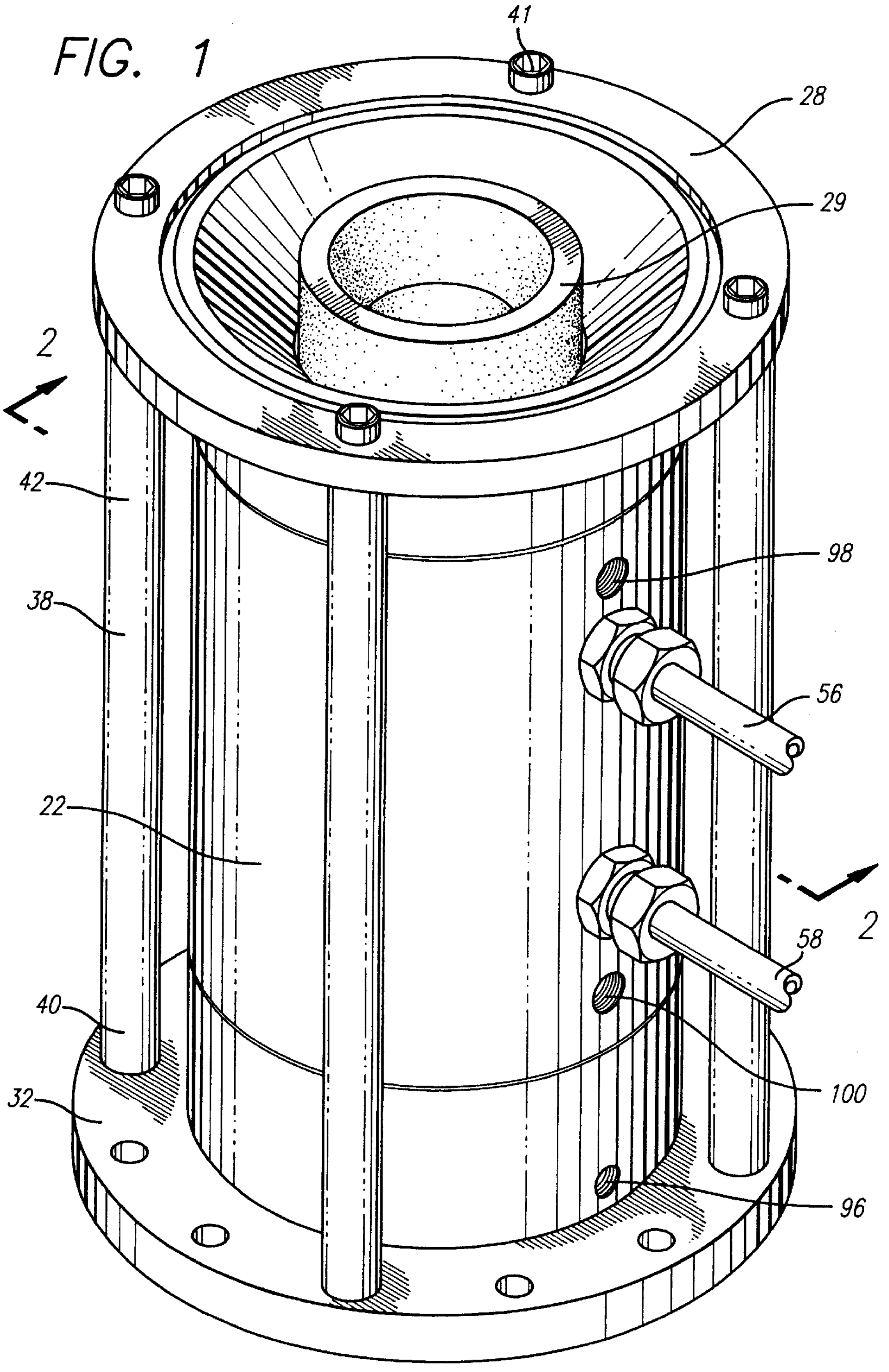
FIG. 1 is a perspective view of a plasma torch assembly, constructed in accordance with the present invention.
Figure 2:
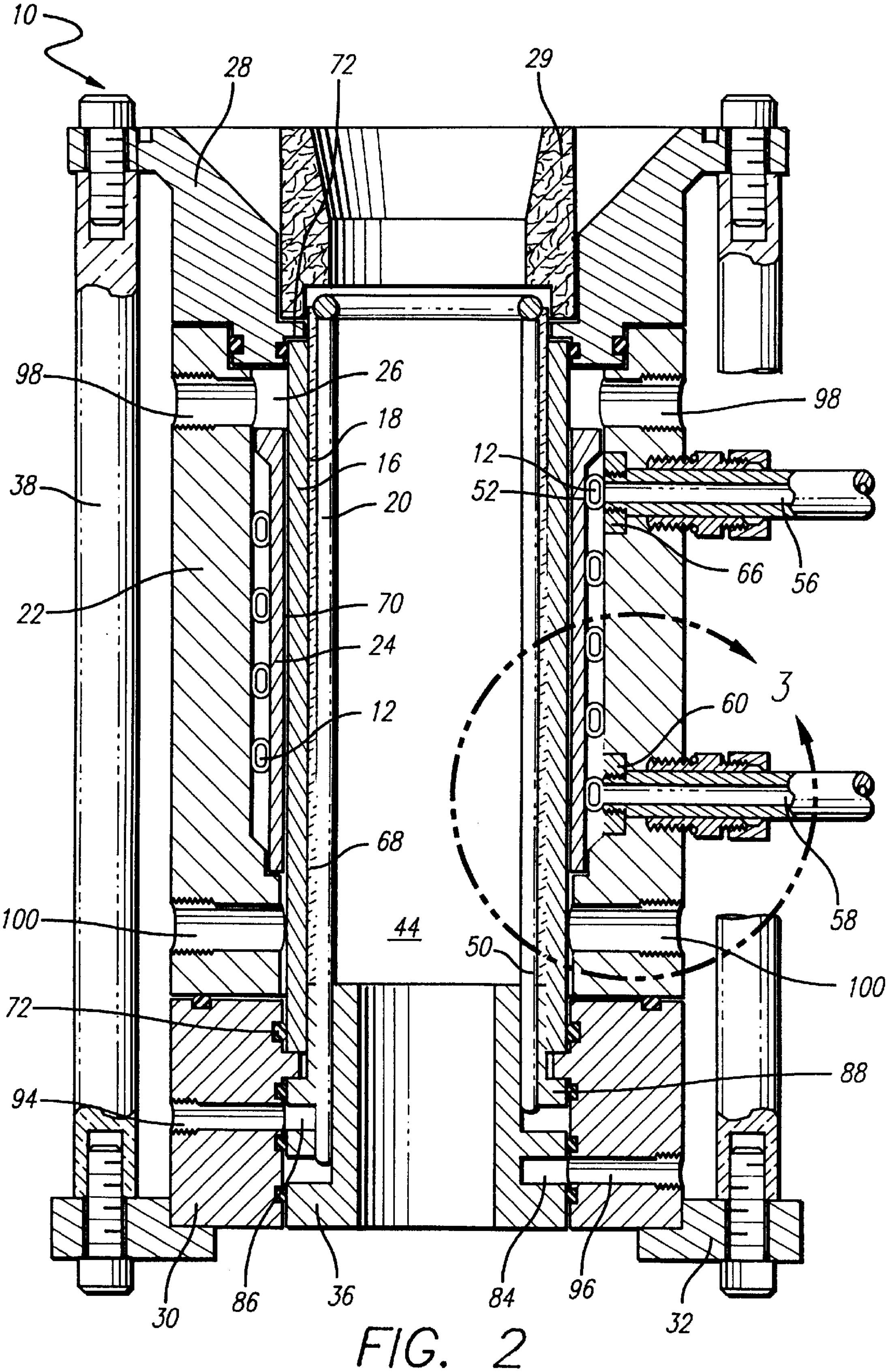
FIG. 2 is a cross-sectional view taken along the line 2—2 of the plasma torch assembly of FIG. 1.
Figure 3:
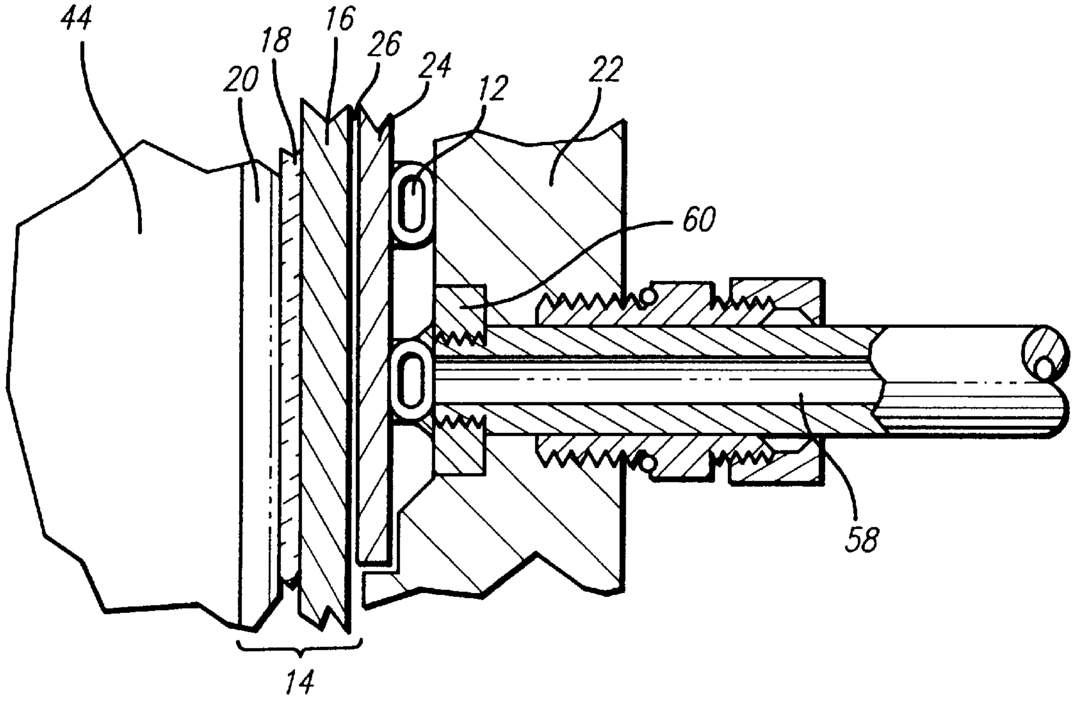
FIG. 3 is an enlarged view showing one portion of the plasma torch assembly of FIG. 2.

Referring to FIGS. 1–3, there is shown generally a plasma torch assembly 10, including an induction coil 12 for generating an electromagnetic field and a shield assembly 14 for transferring the electromagnetic field to excite a gas capable of forming free electrons in a plasma when excited to an elevated temperature. The present invention, including the shield assembly 14, reduces interference with the electromagnetic coupling between the induction coil 12 and gas while providing a protective shield against emitted thermal and light energy. A high frequency radio frequency (RF) plasma for continuous operation at near atmospheric pressures and above is thus generated. The power source frequency, typically is in the range of 0.5 to 15 MHz, with optimal operation typically at approximately 2.85 MHz. The plasma torch assembly 10 typically may be operated at any pressure up to and above ambient pressure.

As is shown in detail in FIG. 3, the shield assembly 14 includes a dielectric cylinder 16, an encasement lining 18 and a plurality of thin wall narrow metal coolant tubes 20 which are ductile, thermally conductive and resistant to chemical and oxidizing attack, all of which are arranged while avoiding gas cavities or gas envelopes between the shield assembly 14 components where undesirable radio frequency discharges can occur.

As will be further noted and hereinafter more fully described, referring to FIGS. 2 and 3, the plasma torch assembly 10 includes, in order of decreasing diameters, a torch body 22, the induction coil 12, a discharge isolator 24, a water coolant jacket 26, the dielectric cylinder 16 which fits tightly upon and surrounds the thermally resistant ceramic encasement lining 18 which in turn is molded upon and between the set of thin wall metal coolant tubes 20 arranged parallel to the system axis in a circular array on a circumference which describes a cylinder of tubes 20 providing the plasma containment space within.

As is shown in FIGS. 1 and 2, the plasma torch assembly 10 includes a cylindrical torch body 22 advantageously made of a high temperature dielectric plastic which can easily be machined and worked. One skilled in the art will recognize that the torch body 22 can be made of any dielectric material suitable for providing a housing to hold and maintain the parts described in detail herein. In a typical configuration, the torch body 22 is made from a high temperature plastic such as a polyetherimide material, sold under the name "Ultem" by General Electric Company. The torch body 22 extends upwardly from an intake fastener ring 32, input end manifold 30 (FIG. 2) and metal wall base manifold 36 (FIG. 2) to an output end manifold 28. Attached to the output end manifold 28 is an exhaust flange 29. Fastener rods 38 for holding the plasma torch assembly 10 together are affixed at their lower ends 40 to the intake fastener ring 32 and extend upwardly therefrom along the perimeter of the torch body 22 until they are affixed at their upper ends 42 to the output end manifold 28. The fastener rods 38 are affixed to the intake fastener ring 32 and the output end manifold 28 using bolts 41. One skilled in the art will recognize though that the fastener rods 38 may be affixed using other commercially available means, such as screws, and so forth. The fastener rods 38 are parallel to one another and are equally spaced from one another about the perimeter of the torch body 22. In a typical configuration, the fastener rods 38 are made from a durable material such as fiberglass.

Referring to FIG. 2, the input end manifold 30 and output end manifold 28 and torch body 22 are annular so as to define a central cylindrical cavity 44 wherein a plasma may be formed by application of a high frequency electrical current to the electrical coil 12, as discussed in detail below. In particular, disposed at the ends of the torch body 22 are the input end manifold 30 and the output end manifold 28 which hold the torch 10 together axially, while the torch body 22 holds the torch together radially. To enhance plasma stability, the input end manifold 30 and output end manifold 28 are preferably ungrounded.

Disposed within and adjacent the inner surface of the torch body 22 is the induction coil 12, made of partially flat copper tubing. The induction coil 12 is advantageously made of partially or totally flat copper tubing. One skilled in the art will recognize that the coil 12 may be made of other conductive materials as well, including but not limited to, round copper tubing. However, the use of a partially or totally flat copper tubing generally allows more of the tubing to be disposed closer to the plasma gas, thereby enhancing coupling of the electromagnetic field to the plasma gas. The coil 12 forms a helix which is coaxial with the chamber axis. In a typical configuration, the coil 12 is made from a copper tubing pressed partially or totally flat and made into a helix coil 12. As is shown in detail in FIGS. 2, 5(*a*) and 5(*b*), each end 52, 54 of the induction coil 12 is electrically connected to a circuit lead 56, 58 through which an RF current and coolant water can be supplied to the coil 12.

Figure 5A:
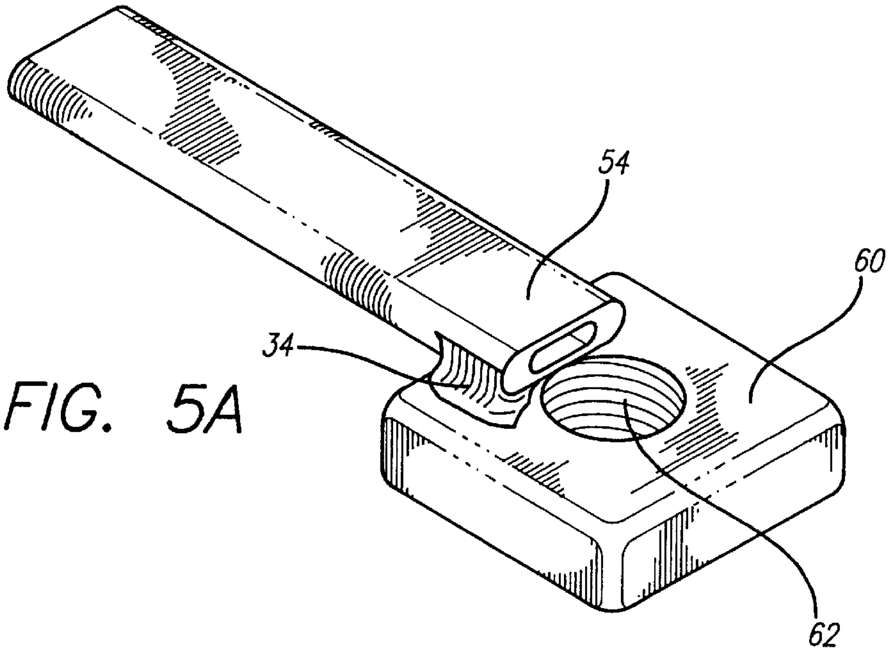
FIG. 5(*a*) is an enlarged, perspective view of a portion of the RF coil of the plasma torch assembly of FIG. 2.
Figure 5B:
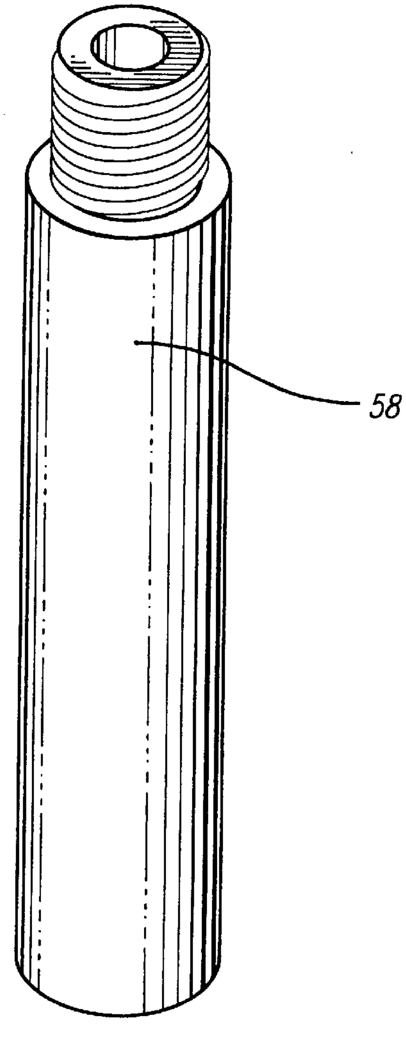

Referring to FIG. 5(*a*), an end 54 of the coil 12 is attached by solder to a connector 60 which is embedded into the torch body 22 and made of a conductive material such as copper. The connector 60 has an aperture 62 for receiving and engaging the circuit lead 58. As shown in FIG. 2, one end 52 of the coil 12 is electrically connected to an input circuit lead 56 and the other end 54 of the coil 12 is electrically connected to an output circuit lead 58. The end 54 of the coil 12 is thus held in place by its connector 60, which in turn is connected to the output circuit lead 58. The other end 52 of the coil 12 is also attached by solder to a connector 66 which is embedded into the torch body 22 and made of a conductive material such as copper. The end 52 of the coil 12 is thus held in place by its connector 66, which in turn is connected to the input circuit lead 56. The coil 12 is attached to the connectors 60, 66 such that it is positioned adjacent to its respective input and output circuit leads 56, 58.

The circuit leads 56, 58 as shown in FIGS. 1 and 2 exit through the torch body 22 and are connected to an RF power source (not shown). Current flows from the RF power source (not shown) to the input circuit lead 56, which is electrically connected to one end 52 of the coil 12 via connector 66, to the output circuit lead 58, which is electrically connected to the other end 54 of the coil 12 via connector 60. In accordance with an advantage of the present invention, the induction coil 12 is securely held in place by the connectors 60, 62 and circuit leads 56, 58, rather than being embedded within the torch body 22, thus facilitating maintenance of the coil 12 if necessary. Coolant water is also pumped through the input circuit lead 56 for cooling the induction coil 12 and is released adjacent the coil 12 thus allowing the coil to be cooled. The coolant water exits via the output circuit lead 58 and/or the torch body coolant output port 100.

The present invention is not limited to the use of an induction coil 12 for generating an electromagnetic field which will eventually be coupled to excite a gas capable of forming free electrons in a plasma when excited to an elevated temperature. Rather, the present invention may be adapted to be used with any appropriately configured and disposed source which is capable of generating an electromagnetic field.

Referring to FIG. 2, disposed adjacent to the induction coil 12, where the electromagnetic field strength is the greatest (i.e., near the coil 12), is a discharge isolator 24 advantageously made of dielectric material for providing additional electrical discharge isolation of the induction coil 12. The discharge isolator 24 is preferably thin walled, cylindrically shaped and is of a length which would be sufficient to isolate any electrical discharges. One skilled in the art will recognize that the discharge isolator 24 may be eliminated if the coolant water and other dielectrics described herein are of high enough dielectric values. In a typical configuration, the discharge isolator 24 is made of a fluoropolymer, for example PTFE sold under the name "Teflon" by DuPont Corporation, having a dielectric strength of approximately 1000 V/mil and sold by Enflo Corporation.

A water coolant jacket 26, a space defined by the discharge isolator 24, dielectric cylinder 16, torch body 22 and input and output manifolds 30, 28, receives water coolant which flows in from the torch body coolant input ports 98 and input circuit lead 56 and out through the torch body output coolant ports 100 and output circuit lead 58. The water in the coolant jacket 26 flows over a portion of the outer surface 70 of the dielectric cylinder 16. In a typical configuration, the coolant water has a resistance equal to or greater than approximately 200 k ohms/cm. Attached at each end of the water coolant jacket 26 are conventionally implemented seals 72, in the form of O-rings, which seal the water coolant jacket 26 from other parts of the torch body 22, such as the input end manifold 30 and the output end manifold 28.

As is shown in detail in FIG. 3, the present invention provides an integrated shield assembly 14 including a dielectric cylinder 16, encasement lining 18 and a plurality of thin walled tubes 20. In accordance with an advantage of the present invention, the shield assembly 14 reduces blockage or interference with the electromagnetic coupling between the induction coil 12 and the ionized gas contained in the cavity 44 of the plasma torch 10, while providing a protective enclosure from the plasma. The shield assembly 14 also provides a protective shield against emitted thermal and light energy which can be destructive to components of a RF plasma torch in that materials can stress, crack or melt due to the elevated temperature. Ultraviolet energy, if unshielded, can also degrade and promote electrical discharges and ionizations.

The dielectric cylinder 16, disposed adjacent and interior to the water coolant jacket 26, provides a water proof barrier against the coolant jacket 26 and supports the ability to draw a vacuum. In a typical configuration, the dielectric material of the dielectric cylinder 16 has a dielectric strength equal to or greater than 200 V/mil and is of a partially ductile and flexible nature which allows it to be tightly fit over the encasement lining 18, thus eliminating any gas envelope where ionization can occur. A dielectric material which meets such requirements is the high temperature plastic sold by General Electric Company under the name "Ultem", referred to earlier, which is a high temperature plastic material. The dielectric cylinder 16 is thus preferably made of a material such that it can be machined to low tolerance on its inner surface 68 to ensure a tight fit with the encasement lining 18. In a typical configuration, the dielectric cylinder 16 is machined within or to 1/1000 th inch over the encasement lining 18. Conventionally implemented seals 72, in the form of O-rings, are disposed at each end of the dielectric cylinder 16 for sealing the dielectric cylinder 16 to the input and output end manifolds 28, 30 within which cooling water circulates and is in contact with the outer surface 70 of the dielectric cylinder 16. In this manner, no vacancy exists between the tubes 20 and the induction coil 12 which is immersed in water and surrounds the dielectric cylinder 16. In accordance with an advantage of the present invention, the elimination of vacancies or spaces between the tubes 20 and the induction coil 12 eliminates the serious problems of plasma discharging in these vacancies.

The tubes 20 are encased by and partially embedded in the encasement lining 18 preferably made of thermal resistant ceramic material that is molded or potted upon the outside surface of the metal tubes 20. The material forming the encasement lining 18, although formed on the outer surface of and between the tubes 20, is not formed on the inner surface of the tubes facing the inner cavity 44. The encasement lining 18 is preferably machined round so that the inner surface 68 of the dielectric cylinder 16 fits snugly upon and surrounding the encasement lining 18. The encasement lining 18 prevents the passage of thermal and light energy from the plasma between the non-occluded line of sight found along the longitudinal spaces between the individual tubes 20. In particular, the encasement lining 18 prevents heat and light energy from coming through between the tubes 20 and destroying any other materials to the outside of the tubes 20 and at the same time fills up spaces that might otherwise be gas voids where destructive plasma might be generated. In accordance with an advantage of the present invention, the encasement lining 18 also functions as a protective dielectric which minimizes electric discharges from the induction coil 12 to the tubes 20 which can be capacitive or grounding discharges. In a typical configuration, the ceramic material should have a dielectric strength equal to or greater than 200 V/mil to minimize breakdown under the stress of the electric field. A ceramic material which meets such requirements is a magnesium oxide base ceramic potting material having a dielectric strength of 280 V/mil which is manufactured as #809 potting compound by Cotronics Corporation.

The dielectric cylinder 16 can be eliminated by water proofing the encasement lining 18 and sealing the plasma torch assembly 10 so a vacuum can be created without the cylinder for plasma ignition or other purpose. In particular, in use, openings defined by the input and output manifolds 30, 28 are sealed to enable a vacuum to be created within the plasma torch assembly 10. A water proof material, such as a glazing compound, may be placed over the outside surface of the encasement lining 18 to prevent water from permeating through the encasement lining 18 which may be porous if made from ceramic material.

Figure 4:
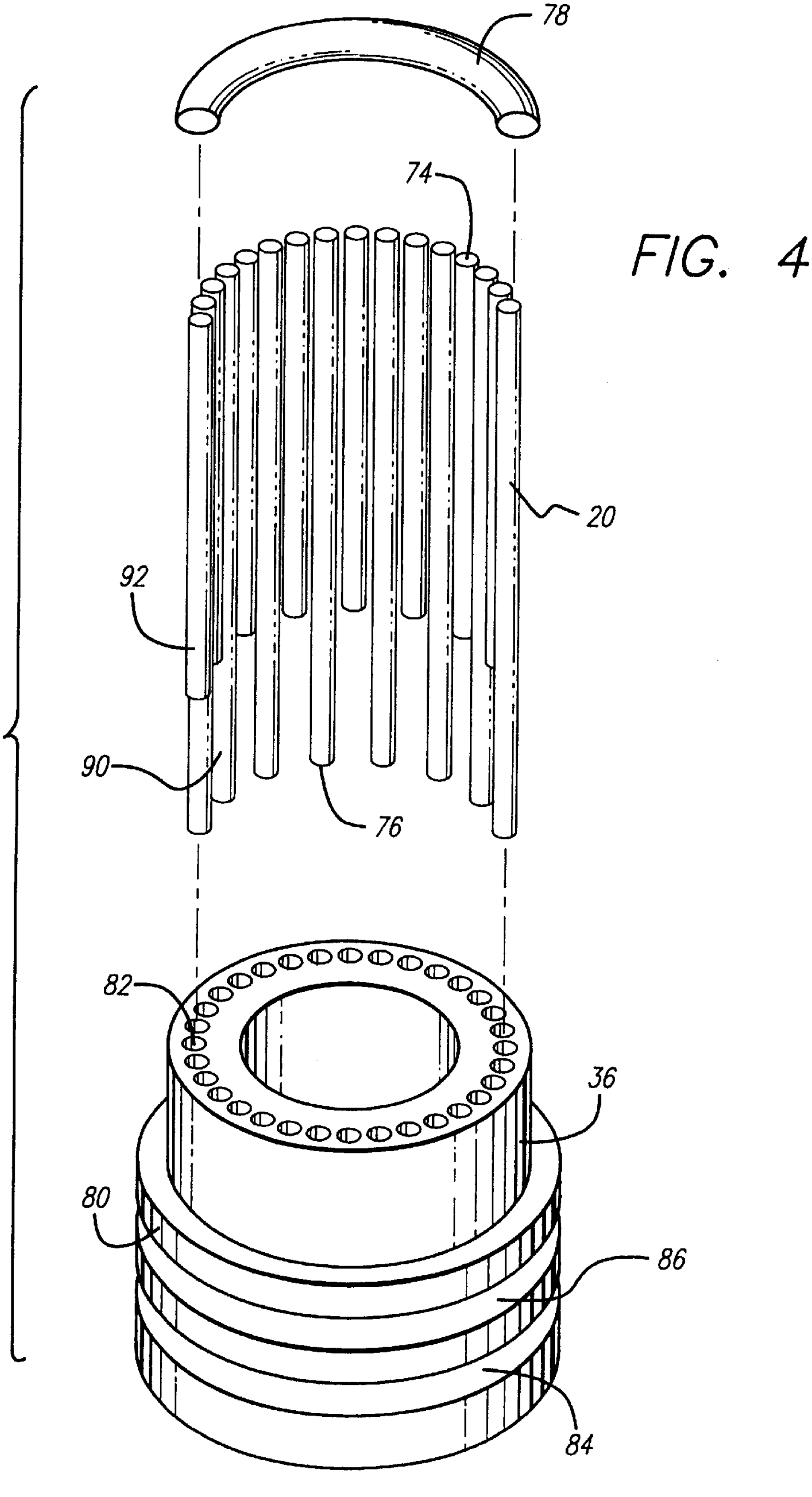
FIG. 4 is an isometric, exploded view of the cross manifold, supply and return tubes and base manifold of the plasma torch assembly of FIG. 2.

As is shown in detail in FIG. 4, the plurality of thin walled tubes 20 are connected at one end 74 to a cross manifold 78 and at the opposite end 76 to a base manifold 36. The tubes 20 are thin walled and narrow in order to decrease the coupling of the exciter electromagnetic field to the tubes and allow efficient coupling of the field to the plasma located centrally in the cavity 44. Since the shield tubes 20 are thin walled and narrow, each being independent, very little energy is trapped within their material thereby allowing for the production of an efficient plasma inside of the cavity 44. In a typical configuration, the tubes 20 have a ratio of wall thickness to outside diameter of tube 20 of approximately 0.25 or less and the tubes 20 are made of a nickel chromium alloy such as a material sold under the name "Inconel" by Incoy Alloys International, Incorporated. In particular, a typical radial cross section would show a circle of tubes 20, typically about 60 each of about ⅛ inch outside diameter and 0.015 inch wall thickness, spaced about 0.007 inch from one another, forming a circular array of tubes about 2.5 inches in diameter to the inside of the array. (For convenience and ease of illustration, the embodiment shown has typically less than 60 tubes.) The tubes 20 are preferably positioned such that they are spaced as closely together as possible. However, since the tubes 20 are affixed at their upper ends 74 to a cross manifold 78 and at their lower ends 76 to a base manifold 36, the spacing between the tubes 20 is dependent upon the spacing between the apertures which receive the tubes 20 on the cross manifold 78 and base manifold 36, which are subject to machining tolerances. The encasement lining 18 is formed in the spacing between the tubes 20 to prevent the passage of thermal and light energy from the plasma. The material forming the encasement lining 18, although formed on the outer surface of and between the tubes 20, is not formed on the inner surface of the tubes facing the inner cavity 44. The tubes 20 are preferably made of metal although one skilled in the art will recognize that any material which has heat transfer abilities and superior thermal shock or stress immunity having a ductile and malleable nature may be used as well.

The tubes 20 are affixed at their upper ends 74 to the cross manifold 78 which returns flow back down the tubes 20 to the other ends 76 which are interfaced with the base manifold 36 which is housed in the input end manifold 30 (FIG. 2). Referring to FIG. 4, the tubes 20 are disposed parallel to one another and are equally spaced from one another, with every other tube 20 being a supply tube 90 to the cross manifold 78. The cross manifold 78 is comprised of a hollow tubular structure having a circular array of apertures for receiving the tubes 20, each of which is advantageously connected to apertures on the cross manifold 78 by solder. In operation, water is injected from a supply valley 84 upwardly within the supply tubes 90, which are connected to the cross manifold 78. The water enters the cross manifold 78 and returns via the return tubes 92 to a return valley 86. In most cases, the water will return via the return tube or tubes 92 disposed adjacent to the supply tube 90. However, since the supply and return tubes 90, 92 are not directly connected at the cross manifold 78, water may return in part through one or more return tubes 92 which are not directly adjacent to a particular supply tube 90. In accordance with an advantage of the present invention, the cross manifold 78 allows for better cooling, eliminates pointed features, and provides better protection from the thermal energy moving to the inside between the cross manifold 78 and the torch body output end manifold 28 where seals and other low thermal tolerant materials are located.

The metal wall base manifold 36, housed in the input end manifold 30, provides for the entrance 96 and exit 94 of de-ionized coolant water which circulates within the shield tubes 20. The surface 50 of the shield tubes 20 which faces the cavity 44 is exposed to the high temperature of the plasma. In particular, the other end of each tube 20 is affixed, advantageously by solder, in an individual bore 82 on either the supply 84 or return valley 86 disposed on the base manifold 36, shown in detail in FIGS. 6(*a*)–6(*d*). As shown in FIGS. 2 and 4, the valleys 84, 86 are separated from one another by gaskets (not shown) in the form of O-rings. Each tube 20 which is connected to a bore 82 on a supply valley 84 is in communication with a water supply for coolant water which is continuously pumped by way of the supply valley 84 through the supply tubes 90. By way of the cross manifold 78, coolant water returns to the return valley 86 on the base manifold 36 through one or more return tubes 92. Thus, in a given set of tubes 20 for the shield assembly 14, there are an equal number of supply and return tubes 90, 92.

A gas, such as argon or air, to form the plasma typically is introduced into the cavity 44 by a plasma sheath manifold (not shown) which is secured to the input end manifold 30 and metal wall base manifold 36 by one or more gasket assemblies, such as ones using an O-ring. The plasma sheath manifold distributes the gas into the cylindrical cavity 44 at a controlled velocity and volume in an axial swirl fashion, contributing to plasma stability. In particular, such a plasma sheath manifold typically includes a plurality of tangentially or angularly disposed apertures which are arranged in a circular array for causing the gas to be pushed out in a swirl therefore causing the gas to be distributed in an axial swirl fashion. One skilled in the art will recognize that the apparatus and method for introducing the gas into the torch may be varied and is not limited to the above description. The gas exits the cavity 44 via the output end manifold 28.

One skilled in the art will also recognize that any apparatus for introducing any material to be made molten, vaporized or dissociated by the plasma may also be secured to the input end manifold 30 and metal wall base manifold 36 by one or more gasket assemblies, such as ones using an O-ring. One skilled in the art will recognize that such material may be in the form of a liquid, powder, or other mixture of material to be injected into the cylindrical cavity 44 for processing.

In operation, the input end manifold assembly 30 with the plasma sheath manifold (not shown) serves to inject and distribute an ionizable gas, such as argon, into the cylindrical cavity 44 at a controlled velocity and volume in an axial swirl fashion. Each tube 20 which is connected to a bore 82 on the supply valley 84 is in communication with a water supply (not shown) which continuously pumps water from the water supply via the supply valley 84 up through the supply tubes 20. Via the cross manifold 78, water returns to the return valley 86 on the base manifold 36 through one or more return tubes 92.

The water coolant jacket 26 receives water coolant which flows in from the torch body coolant input ports 98 and input circuit lead 56 and out through the torch body output coolant ports 100 and output circuit lead 58. With cooling water flowing, the power source for the induction coil 12 is energized and an RF current is applied to the induction coil 12 to produce an RF field. The shield assembly 14 transfers the RF field into the cavity 44 to excite the gas to form a plasma of ions, electrons and neutral particles and to maintain the plasma. Electron oscillations are thus induced by the coupled RF field. With the plasma torch 10 operating typically at 35 to 85 kilowatts, the oscillations raise the average plasma gas temperature (ions, electrons and neutral particles) to elevated temperatures typically ranging from approximately 4500 to 8500 degrees Celsius.

The gas is thus introduced into the cavity 44 using the plasma sheath manifold and exits the cavity 44 via the output end manifold 28. In the cavity 44, the plasma torch 10 forms a plasma of ions, electrons and neutral particles which is used to act on materials, such as waste material, to dissociate the material so that other compounds or materials may be formed from it. In particular, the plasma torch 10 is used to excite the ions, electrons and neutral particles to an elevated temperature such that they disassociate the material which is injected into the cavity 44 as a result of collisions and ultraviolet radiation.

It, of course, will be appreciated by those skilled in the art that many modifications and variations may be made in what has been specifically described without departing from the scope or spirit of the invention. By way of example, an insulator may be disposed about a portion of the exhaust flange which is exposed to the elevated temperature of the plasma, particularly where the encasement lining extends beyond a portion of the exhaust flange 29. By way of another example, the exhaust flange 29 may be modified for better insulation. By way of further example, the discharge isolator 24 may include a plurality of slotted apertures to allow the coolant water to travel through portions of the discharge isolator 24. These other forms, as indicated, are merely exemplary. Accordingly, the scope of the invention shall not be referenced to the disclosed embodiment, but on the contrary, shall be determined in accordance with the claims that follow.

What is claimed is:

1. A plasma torch assembly for receiving electrical energy from an electrical energy source and generating a plasma in a gas from a gas source, comprising:

a field-generating structure to receive electrical energy from the electrical energy source and provide energy to generate an electromagnetic field in a space for the plasma said field-generating structure disposed along and about the space for the plasma;

a shield assembly, disposed along and about the space for the plasma between said field-generating structure and the space for the plasma, to shield against energy from the plasma and transfer energy from said structure, said shield assembly including a liner and coolant structures embedded in said liner.

2. A plasma torch assembly as defined in claim 1, wherein:

said shield assembly is formed to shield against thermal and light energy and to transfer electromagnetic energy.

3. A plasma torch assembly as claimed in claim 1, wherein said shield assembly comprises:

a liner; and coolant structures embedded in said liner.

4. A plasma torch assembly as claimed in claim 1, wherein:

said liner is formed from a ceramic material.

5. A plasma torch assembly as claimed in claim 1, wherein:

said coolant structures are partially embedded in said liner.

6. A plasma torch assembly as claimed in claim 1, wherein:

said coolant structures are formed from a metallic material.

7. A plasma torch assembly as claimed in claim 1, wherein:

said coolant structures comprise tubes disposed along and about the space for the plasma between said field-generating structure and the space for the plasma.

8. A plasma torch assembly as claimed in claim 1, wherein:

said shield further comprises a dielectric cover fitted about said liner for sealing the torch assembly.

9. A plasma torch assembly as claimed in claim 1, wherein:

said field-generating structure comprises an induction coil.

10. A plasma torch assembly as claimed in claim 1 for circulating a coolant liquid, further comprising:

a first manifold structure for a first end of said shield assembly for circulating the coolant through said coolant structures of said shield assembly; and a second manifold structure for a second end of said shield assembly for circulating the coolant through said coolant structures.

11. A plasma torch assembly as claimed in claim 10, wherein:

said shield assembly comprises coolant structures for said circulating.

12. A plasma torch assembly as claimed in claim 10, wherein:

said coolant structures comprise a plurality of supply tubes for said first manifold and a plurality of return tubes for said first manifold.

13. A plasma torch as claimed in claim 12, wherein:

said supply tubes and said return tubes have different lengths.

14. A plasma torch assembly for receiving electrical energy from an electrical energy source and generating a plasma in a gas from a gas source, comprising:

a field-generating structure to receive electrical energy from the electrical energy source and provide energy to generate an electromagnetic field in a space for the plasma, said field-generating structure disposed along and about the space for the plasma; and a shield assembly, disposed along and about the space for the plasma between said field-generating structure and the space for the plasma, to shield against energy from the plasma and transfer energy from said structure, said shield assembly including a liner formed from a ceramic material and structures formed from a metallic material embedded in said liner.

15. A plasma torch assembly as claimed in claim 14, wherein:

said embedded structures are partially embedded in said liner.

16. A plasma torch assembly as claimed in claim 14, wherein:

said embedded structures comprise tubes disposed along and about the space for the plasma between said field-generating structure and the space for the plasma.

17. A plasma torch assembly as claimed in claim 14, wherein:

said shield further comprises a dielectric cover fitted about said liner for sealing the torch assembly.

18. A plasma torch assembly as claimed in claim 14, wherein:

said field-generating structure comprises an induction coil.

19. A plasma torch assembly for receiving electrical energy from an electrical energy source and generating a plasma in a gas from a gas source and having an axial direction for the flow of gas through the assembly, comprising:

a structure to receive electrical energy from the electrical energy source and provide energy to generate an electromagnetic field in a space for the plasma; and a shield assembly about the space for the plasma, to shield against energy from the plasma and transfer energy from said structure, said shield assembly including, an array of elongated structures disposed along and about the space for the plasma, having directions of elongation generally along said axial direction and having spaces between said structures generally along said axial direction, and a liner in said spaces between said elongated structures.

20. A plasma torch assembly as defined in claim 19, wherein:

said shield assembly is formed to shield against thermal and light energy and to transfer electromagnetic energy.

21. A plasma torch assembly as claimed in claim 19, wherein said elongated structures comprise:

elongated coolant structures embedded in said liner.

22. A plasma torch assembly as claimed in claim 21, wherein:

said coolant structures are partially embedded in said liner.

23. A plasma torch assembly as claimed in claim 21, wherein:

said coolant structures are formed from a metallic material.

24. A plasma torch assembly as claimed in claim 21, wherein:

said coolant structures comprise tubes.

25. A plasma torch assembly as claimed in claim 21, wherein:

said shield further comprises a dielectric cover fitted about said liner for sealing the torch assembly.

26. A plasma torch assembly as claimed in claim 19, wherein:

said liner is formed from a ceramic material.

27. A plasma torch assembly as claimed in claim 19, wherein:

said field-generating structure comprises an induction coil.

28. A plasma torch assembly as claimed in claim 19 for circulating a coolant liquid, further comprising:

a first manifold structure for a first end of said shield assembly for circulating the coolant through said shield assembly; and a second manifold structure for a second end of said shield assembly for circulating the coolant through said shield assembly.

29. A plasma torch assembly as claimed in claim 28, wherein:

said elongated structures comprise coolant structures for said circulating.

30. A plasma torch assembly as claimed in claim 29, wherein:

said coolant structures comprise a plurality of supply tubes for said first manifold and a plurality of return tubes for said first manifold.

31. A plasma torch assembly as claimed in claim 30, wherein:

said supply tubes and said return tubes have different lengths.

32. A plasma torch assembly as defined in claim 19, wherein:

said liner is disposed in surrounding contact about and between said elongated structures.

* * * * *